(12) United States Patent
Guérin

(10) Patent No.: US 11,168,603 B2
(45) Date of Patent: Nov. 9, 2021

(54) MOUNTING ASSEMBLY UNIT

(71) Applicant: Eberspächer Exhaust Technology GmbH & Co. KG, Neunkirchen (DE)

(72) Inventor: Véronique Guérin, Stuttgart (DE)

(73) Assignee: Purem GmbH, Neunkirchen (DE)

(*) Notice: Subject to any disclaimer, the term of this patent is extended or adjusted under 35 U.S.C. 154(b) by 775 days.

(21) Appl. No.: 15/943,995

(22) Filed: Apr. 3, 2018

(65) Prior Publication Data
US 2018/0283256 A1    Oct. 4, 2018

(30) Foreign Application Priority Data
Apr. 4, 2017 (DE) .................. 10 2017 107 162.8

(51) Int. Cl.
| | |
|---|---|
| *F16B 41/00* | (2006.01) |
| *F16B 37/02* | (2006.01) |
| *F01N 13/18* | (2010.01) |
| *F16B 5/02* | (2006.01) |
| *B60K 13/04* | (2006.01) |
| *B62D 27/06* | (2006.01) |

(52) U.S. Cl.
CPC .......... *F01N 13/1805* (2013.01); *B60K 13/04* (2013.01); *F16B 5/02* (2013.01); *F16B 37/02* (2013.01); *F16B 41/002* (2013.01); *B62D 27/065* (2013.01); *Y10T 403/1683* (2015.01)

(58) Field of Classification Search
CPC .... Y10T 403/1683; Y10T 403/16; F16B 5/02; F16B 43/00; F16B 41/002; F16B 39/22; F16B 39/24; F16B 37/02; F16B 37/061; F01N 13/1822; F01N 13/1805
See application file for complete search history.

(56) References Cited

U.S. PATENT DOCUMENTS

| | | | | |
|---|---|---|---|---|
| 2,213,924 A | * | 9/1940 | Tinnerman | ............ F16B 37/041 403/21 |
| 2,342,170 A | * | 2/1944 | Tinnerman | ............ F16B 39/32 411/554 |
| 2,401,672 A | * | 6/1946 | Tinnerman | ............ F16B 37/02 411/437 |

(Continued)

FOREIGN PATENT DOCUMENTS

| | | |
|---|---|---|
| CN | 2285848 Y | 7/1998 |
| CN | 1749587 A | 3/2006 |

(Continued)

*Primary Examiner* — Michael P Ferguson
(74) *Attorney, Agent, or Firm* — McGlew and Tuttle, P.C.

(57) ABSTRACT

A mounting assembly unit includes a mounting element (12) to be fixed by at least one fastening bolt (30). At least one mounting element passage opening (14, 16) is provided in the mounting element (12) for the passage of the at least one fastening bolt (30). A mounting aid unit (18a, 18b) associated with at least one mounting element passage opening (14, 16) is provided at the mounting element (12). The mounting aid unit (18a, 18b) associated with the mounting element passage opening (14, 16) has a mounting aid unit passage opening (22a, 22b), which is positioned aligned with respect to the mounting element passage opening, such that an edge area (28a, 28b) of the mounting aid unit (18a, 18b), which edge area surrounds the mounting aid unit passage opening (22a, 22b), is arranged overlapping the mounting element passage opening (14, 16) in some areas.

8 Claims, 1 Drawing Sheet

(56) References Cited

U.S. PATENT DOCUMENTS

| | | | | |
|---|---|---|---|---|
| 5,359,824 | A | * | 11/1994 | Koberstein ............. E04C 2/428 |
| | | | | 411/148 |
| 5,775,862 | A | * | 7/1998 | Cullen ................ F16B 37/0842 |
| | | | | 411/433 |
| 5,921,737 | A | * | 7/1999 | Ibey ........................ H02G 3/18 |
| | | | | 411/535 |
| 6,280,129 | B1 | * | 8/2001 | Lowry .................... F16B 13/06 |
| | | | | 411/173 |
| 2006/0056936 | A1 | | 3/2006 | Ishimaru et al. |

FOREIGN PATENT DOCUMENTS

| | | |
|---|---|---|
| CN | 2851695 Y | 12/2006 |
| CN | 103 195 788 A | 7/2013 |
| DE | 26 06 940 A1 | 9/1976 |
| DE | 38 10 822 A1 | 10/1989 |
| DE | 92 11 255 U1 | 10/1992 |
| DE | 199 16 203 A1 | 5/2000 |
| DE | 103 05 610 A1 | 8/2004 |
| DE | 20 2013 000387 U1 | 1/2014 |
| DE | 20 2013 004 139 U1 | 8/2014 |
| FR | 2 893 682 A1 | 5/2007 |
| GB | 2 376 729 A | 12/2002 |
| JP | 2006064046 A | 3/2006 |

* cited by examiner

MOUNTING ASSEMBLY UNIT

CROSS REFERENCE TO RELATED APPLICATIONS

This application claims the benefit of priority under 35 U.S.C. § 119 of German Application 10 2017 107 162.8, filed Apr. 4, 2017, the entire contents of which are incorporated herein by reference.

FIELD OF THE INVENTION

The present invention pertains to a mounting assembly unit, which can be used, for example, to fix a component in a motor vehicle, for example, an exhaust system, to the motor vehicle.

BACKGROUND OF THE INVENTION

Such a mounting assembly unit may comprise a mounting element with a clamp-like configuration and made of metallic material, which is configured for fastening to a component, for example, to an exhaust system, to be fixed by this mounting element, on the one hand, and which has at least one mounting element passage opening, through which a fastening bolt, for example, a screw bolt, can be passed, on the other hand, so that a fixed connection is established after mounting a nut onto the screw bolt. The connection to the components to be fixed by means of the mounting element may also take place in this manner.

In order to obtain a premounting of a mounting element with one or more fastening bolts, especially screw bolts, in case of such mounting assembly units and thereby to ensure that a falling out of the fastening bolts from mounting element passage openings, through which each of the fastening bolts has passed through, is avoided, it is known to provide securing elements such as retaining washers or circlips or the like at the fastening bolts passing through the associated mounting element passage openings. Such securing elements have, however, a comparatively massive configuration and may only be used in such intended uses, in which the connection to be established between a mounting element and another assembly unit is not impaired by the presence of such a massive securing element.

SUMMARY OF THE INVENTION

An object of the present invention is to provide a mounting assembly unit, in which an undesired loosening of a fastening bolt from a mounting element is prevented in a simple and reliable manner.

According to the present invention, this object is accomplished by a mounting assembly unit, which comprises a mounting element to be fixed by means of at least one fastening bolt, wherein at least one mounting element passage opening is provided in the mounting element for the passage of at least one fastening bolt, wherein a mounting aid unit associated with at least one mounting element passage opening is provided at the mounting element, wherein the mounting aid unit associated with the mounting element passage opening has a mounting aid unit passage opening which is positioned aligned in respect to the mounting element passage opening such that an edge area of the mounting aid unit, which edge area surrounds the mounting aid unit passage opening, is arranged overlapping the mounting element passage opening in some areas.

Since a mounting aid unit provides a holding together with one or more fastening bolts at the mounting element itself in the mounting assembly unit according to the present invention, the functionality of such a secured fastening bolt is not impaired by the mounting aid unit during the further mounting, especially the interaction with a locking element, for example, a nut or the like.

In order to further improve the holding together of the mounting element with one or more fastening bolts, it is proposed that the mounting aid unit with two sections of the edge area, which sections are located opposite one another, be arranged overlapping the mounting element passage opening.

A reliable holding action can be guaranteed here by a distance of the two sections of the edge area being shorter than an external diameter of a fastening bolt, which is to be positioned or is positioned passing through the mounting element passage opening.

In order to be able to obtain a greater freedom in the positioning of the mounting element during the mounting of same, it is proposed that the mounting element passage opening be elongated and have an opening width obliquely to its direction of longitudinal extension, wherein the opening width is greater than an external diameter of a fastening bolt, which is to be positioned or is positioned passing through the mounting element passage opening. The mounting element passage opening is thus configured like an elongated hole and allows the movement of a fastening bolt passing through this mounting element passage opening especially in the direction of the longitudinal extension of the mounting element passage opening.

In order to be able to obtain a reliable holding interaction here regardless of the relative positioning between the fastening bolt and the mounting element, it is proposed that the mounting aid unit passage opening be elongated and have an opening width, the opening width of the mounting aid unit passage opening being smaller than the opening width of the mounting element passage opening. Thus, a holding interaction can be obtained between the fastening bolt passing through this mounting element passage opening and the mounting aid unit associated with this mounting element passage opening, for example, over the entire length of the mounting element passage opening. Provisions may especially be made here for each of the two sections of the edge area of the mounting aid unit passage opening to be a longitudinal edge section extending in the direction of longitudinal extension of the mounting aid unit passage opening.

For a configuration which is especially simple to manufacture, it is proposed that the mounting aid unit comprise a mounting aid element and that the mounting aid unit passage opening be an opening formed in the mounting aid element.

In this case, the mounting aid element is especially simple to handle and to position with respect to the mounting element when the opening formed in the mounting aid element is closed.

In an alternative embodiment, the mounting aid unit may comprise two mounting aid elements arranged so as to provide an intermediate space forming the mounting aid unit passage opening. In this case, each of the two mounting aid elements provides one of the sections of the edge area.

In order to avoid an impairment of the system to be constructed using the mounting assembly unit due to the presence of one or more mounting aid elements, it is proposed that the mounting aid unit have a thickness of less than 0.1 mm, preferably of less than 0.08 mm, and most preferably of about 0.05 mm such a thin mounting aid element may remain as a lost component between the mounting element and the assembly unit to be mounted with same, without an impairment of the system thus configured occurring as a result.

The mounting aid unit may also be made of metallic material for stability reasons. Furthermore, when the mounting element is made of metallic material, the mounting aid unit may be fixed to the mounting element by welding, preferably spot welding.

The mounting assembly unit configured according to the present invention may be provided such that in at least one mounting element passage opening, at least one fastening bolt is held by a mounting aid unit associated with the mounting element passage opening.

At least one fastening bolt may be, for example, a screw bolt.

It should be pointed out that one or more mounting element passage openings may be provided in a mounting element in case of one and the same mounting assembly unit, wherein advantageously, but not necessarily, a mounting aid unit may be associated with each mounting element passage opening. If a plurality of mounting aid units are provided at a mounting element, these mounting aid units may be shaped identical to one another or different from one another.

The present invention is described below with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
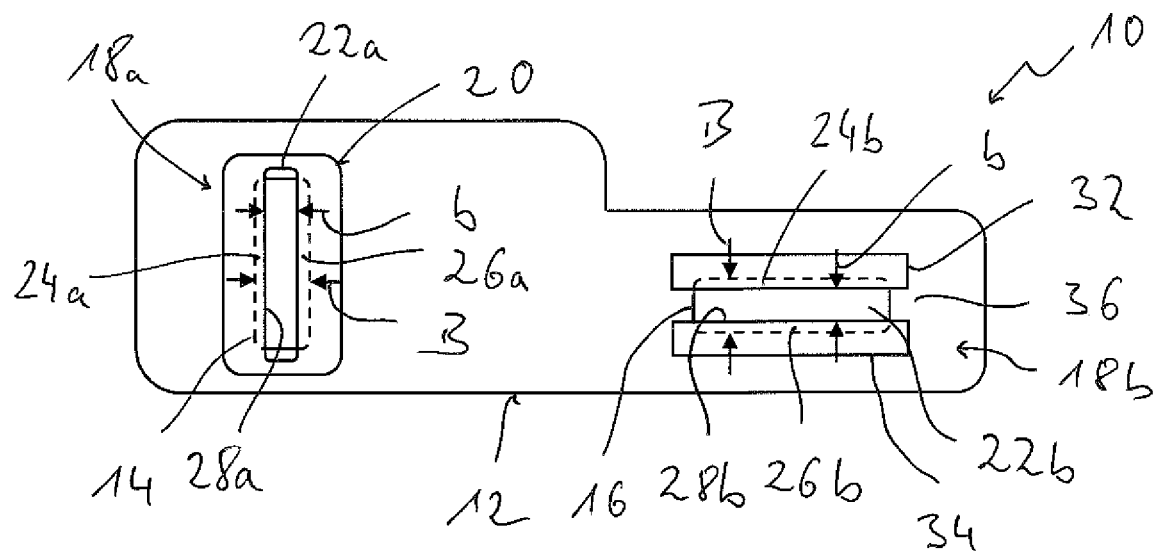
FIG. 1 is a mounting assembly unit with a mounting element and two mounting aid units provided on it.

Referring to the drawings, FIG. 1 shows a top view of a mounting assembly unit 10, which can be used, for example, to fix an exhaust system in a motor vehicle to the motor vehicle.

The mounting assembly unit 10 comprises a clamp-like mounting element 12, which is made, for example, of sheet metal material, and in which two mounting element passage openings 14, 16 are formed. The two mounting element passage openings are elongated and are thus configured like respective elongated holes. They have an opening width B obliquely to their longitudinal extension that is greater than the diameter of a fastening bolt, which is to be positioned passing through same. Such a fastening bolt is preferably configured as a screw bolt and may be used by interaction with a locking element, which is configured as a nut or the like, for fixing the mounting assembly unit 10.

A mounting aid unit 18a or 18b each is provided in association with each of the two mounting element passage openings 14, 16. These mounting aid units 18a, 18b ensure that before mounting a locking element, i.e., for example, a nut, at a fastening bolt passing through each of the associated mounting element passage openings 14 or 16, an undesired loosening of such fastening bolts from the mounting element 12 is prevented and a loosening of the mounting element 12 from fastening bolts passing through a respective mounting element passage opening 14 or 16 is avoided.

The mounting aid unit 18a provided in association with the mounting element passage opening 14 comprises a mounting aid element 20 made of very thin metallic material, preferably sheet metal material. The mounting aid element 20 preferably has a thickness in the range of 0.05 mm and is permanently connected to the mounting element 12, for example, by spot welding.

The mounting aid element 20 has a mounting aid unit passage opening 22a which is associated with the mounting element passage opening 14. In association with the elongated configuration of the mounting element passage opening 14, the mounting aid unit passage opening 22a is also elongated and has an opening width b which is smaller than the opening width B of the mounting element passage opening 12. The length of extension of the mounting aid unit passage opening 22a essentially corresponds to the length of extension of the mounting element passage opening 14, but may also be slightly greater or smaller than same.

The mounting aid element 20 is positioned with its mounting aid unit passage opening 22a with respect to the mounting element passage opening 14 such that, for example, longitudinal central axes of these two openings run aligned with one another. A configuration is thus obtained, in which in the direction of the opening width b of the mounting aid unit passage opening 22a, sections 24a, 26a, which are located opposite one another, of an edge area 28a of the mounting aid element 20, which edge area surrounds the mounting aid unit passage opening 22a, overlap the mounting element passage opening 14 in some areas, so that the mounting aid element 20 extends into the area of the mounting element passage opening 14 with these sections 24a, 26a.

Figure 2:
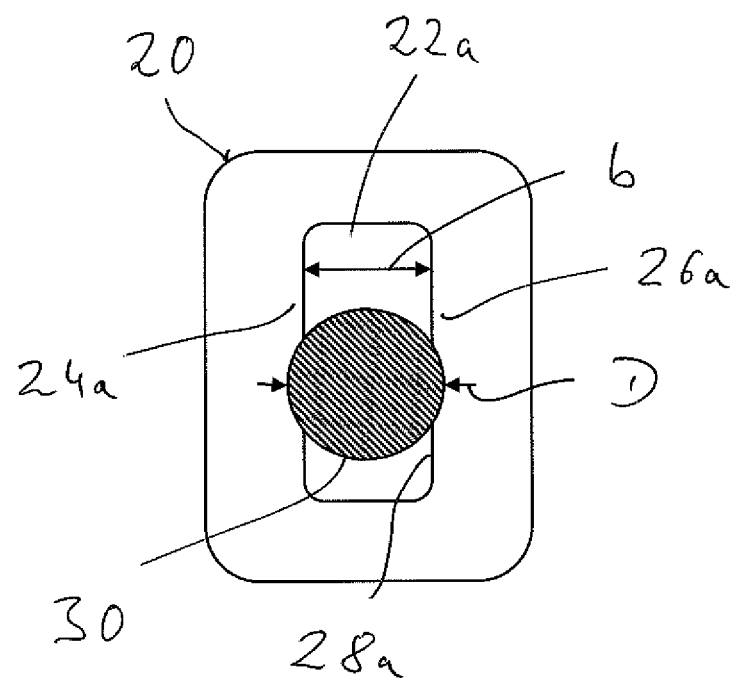
FIG. 2 is a mounting aid element in connection with a fastening bolt passing through a mounting aid unit passage opening of same.

FIG. 2 shows the mounting aid element 20 in interaction with a fastening bolt 30, which is configured, for example, as a screw bolt, passing through the mounting element passage opening 14 and also the mounting aid unit passage opening 22a. It is seen in FIG. 2 that the opening width b is coordinated with the diameter D of the fastening element 30, which is generally provided with an essentially circular cross-sectional geometry, such that the opening width b is smaller than the diameter D. Of course, the mounting element passage opening 14 is dimensioned such that the opening width B thereof is at least slightly greater than the diameter D, so that the fastening bolt 30 can be positioned passing through the mounting element passage opening 14 and when the fastening bolt 30 passes through the mounting element passage opening 14, the mounting element 12 can be brought into its position provided for installation.

Because the mounting aid element 20 is made of a material that is very thin and thus also comparatively easily deformable, the fastening bolt 30 is also moved through the mounting aid unit passage opening 22a where the fastening bolt 30 is passed through the mounting element passage opening 14, and thus the mounting aid element 20 is deformed or possibly even destroyed locally in the area of the sections 24a, 26a of the edge area 28a. Nevertheless, the mounting aid element 20 encloses the fastening bolt 30 passing through the mounting aid unit passage opening 22a and may mesh with the outer thread of same when the fastening bolt 30 is configured as a screw bolt. The fastening bolt 30 is thus held in its position passing through the mounting element passage opening 14 by the comparatively thin mounting aid element 20 of the mounting aid unit 18a, but may nevertheless be moved in the direction of longitudinal extension of the mounting element passage opening 14 and also of the longitudinal extension of the mounting element passage opening 14 and also of the mounting aid unit passage opening 22a. Because of the comparatively small thickness of the mounting aid element 20, any damage to the fastening bolt 30 at its outer circumferential area, especially at a thread possibly provided there, is ruled out here. Especially when the mounting aid element 20 is advantageously centered with respect to the mounting element passage opening 14 in the direction of the opening width, and thus when the two sections 24a, 26a of the edge area 28a, as viewed in the direction of the opening width, overlap the mounting element passage opening 14 essentially to the same extent, a centering action for the fastening element 30 with respect to the mounting element passage opening 14 in the direction of the opening width B is, in addition, achieved by the mounting aid element 20.

It should be pointed out that the configuration of the mounting aid element 20 shown in FIGS. 1 and 2 with a mounting aid unit passage opening 22a formed therein being closed especially when using very thin material for making the mounting aid element 20 is especially preferred because of easier handling. In principle, the mounting aid unit passage opening 22a could, however, also be configured as being open at at least one circumferential area, so that, for example, the mounting aid element 20, deviating from the O-shaped configuration shown, could have an essentially C-shaped configuration.

The mounting aid unit 18b provided in association with the mounting element passage opening 16 comprises two mounting aid elements 32, 34, which have a strap-like or strip-like configuration. Each of these two mounting aid elements 32, 34 is preferably made of a very thin metallic material or sheet metal material, for example, with a thickness in the range of 0.05 mm and is fixed to the mounting element 12 by welding, preferably spot welding.

The two mounting aid elements 32, 34 are positioned with respect to the mounting element passage opening 16, which passage opening has an elongated configuration, such that they extend in the direction of longitudinal extension of the mounting element passage opening 16 and leave between them a distance 36 providing the mounting aid unit passage opening 22b. This distance 36, which defines the opening width b of the mounting aid unit passage opening 22b, is dimensioned such that it is slightly shorter than the opening width B of the mounting element passage opening 16. Thus, the two mounting aid elements 32, 34 extend overlapping the mounting element passage opening 16 each with sections 24b, 26b of an edge area 38b of the mounting aid unit 18b, which edge area 38b is provided by these sections. The same holding interaction between the mounting aid unit 18b and a fastening bolt passing through the mounting element passage opening 16 can be achieved thereby, as was explained above with reference to FIGS. 1 and 2 on the basis of the mounting aid element 20 of the mounting aid unit 18a.

It should finally be pointed out that, as shown in FIG. 1, mounting aid units of different design can be used in association with one and the same mounting element, but mounting aid units of identical design may, in principle, also be provided. Further, it is, of course, possible that when a plurality of mounting element passage openings are provided at one mounting element, only one mounting aid unit can or should be provided in association with such a mounting element passage opening, in which mounting aid unit a securing function shall also be obtained.

Such a mounting assembly unit configured according to the present invention may comprise a fastening bolt in association with one or more mounting element passage openings positioned passing through these mounting element passage openings and secured by an associated mounting aid unit and may then be arranged and fastened as a premounting assembly unit at the suitable position. In principle, the fastening bolts, which are to be positioned passing through a mounting element passage opening each, could, however, also be premounted at that assembly unit, to which the mounting assembly unit is to be fixed. This mounting assembly unit can then be positioned during the mounting such that the fastening bolts already provided at the other assembly unit pass through the mounting aid unit passage openings in the mounting assembly unit. Due to the securing interaction between the fastening bolts and mounting aid units associated with each of these bolts, a loosening of the mounting assembly unit from the fastening bolts is prevented, so that locking elements, e.g., nuts, can subsequently be mounted in a simple manner onto the fastening bolts and thus the mounting assembly unit can be fixed.

Even though it is especially advantageous to make the mounting aid units from comparatively thin sheet metal material for stability reasons, it is obvious that other materials, e.g., film-like plastic material, may also be used, wherein such materials can then be fixed to a mounting element, for example, by bonding.

While specific embodiments of the invention have been shown and described in detail to illustrate the application of the principles of the invention, it will be understood that the invention may be embodied otherwise without departing from such principles.

What is claimed is:

1. A mounting assembly unit for preassembling a fastening bolt with a mounting element, comprising:
    a mounting element made of metallic material to be fixed to a component by means of at least one fastening bolt, wherein at least one mounting element passage opening is provided in the mounting element for the passage of the at least one fastening bolt;
    at least one mounting aid unit made of metallic material with a thickness of less than 0.1 mm, each unit being fixed to the mounting element by welding and defining a mounting aid unit passage opening associated with a respective one of the at least one mounting element passage openings; and
    a threaded fastening bold extending through the at least one mounting element passage opening and held by the mounting aid unit,
    wherein the at least one mounting element passage opening is elongated and has an opening width obliquely to a direction of longitudinal extension of the mounting element passage opening, the opening width being greater than an external diameter of the fastening bolt,
    wherein the mounting aid unit passage opening is elongated and has an opening width obliquely to a direction of longitudinal extension of the mounting aid unit passage opening, the opening width of the mounting aid unit passage opening being smaller than the opening width of the at least one mounting element passage opening,
    wherein the mounting aid unit passage opening is positioned aligned with respect to the mounting element passage opening, such that two opposing longitudinal edge sections of an edge area of the mounting aid unit, which surround the mounting aid unit passage opening and extend in the direction of longitudinal extension thereof, overlap the mounting element passage opening at opposing longitudinal ends thereof, and wherein a distance between the two longitudinal edge sections is shorter than the external diameter of the fastening bolt such that the longitudinal edge sections deformably interlock with the thread of the fastening bolt to retain the bolt in a preassembled condition therewith.

2. A mounting assembly unit in accordance with claim 1, wherein:

the mounting aid unit comprises a single mounting aid element; and the mounting aid unit passage opening is an opening formed in the mounting aid element.

3. A mounting assembly unit in accordance with claim 2, wherein the opening formed in the mounting aid element is closed.

4. A mounting assembly unit in accordance with claim 1, wherein the mounting aid unit comprises two mounting aid elements arranged so as to provide an intermediate space forming the mounting aid unit passage opening.

5. A mounting assembly unit in accordance with claim 4, wherein:

each of the two mounting aid elements provides one of the longitudinal edge sections of the edge area.

6. A mounting assembly unit in accordance with claim 1, wherein the mounting aid unit has a thickness of less than 0.08 mm.

7. A mounting assembly unit in accordance with claim 1, wherein the mounting aid unit has a thickness of less than about 0.05 mm.

8. A mounting assembly unit in accordance with claim 1, wherein the at least one fastening bolt is a screw bolt.

* * * * *